United States Patent

Schellekens

[11] Patent Number: 5,776,022
[45] Date of Patent: Jul. 7, 1998

[54] PULLEY

[75] Inventor: Antonius Lambertus Hermanus Schellekens, Tilburg, Netherlands

[73] Assignee: Van Doorne's Transmissie B.V., Tilburg, Netherlands

[21] Appl. No.: 691,016

[22] Filed: Aug. 5, 1996

[30] Foreign Application Priority Data

Aug. 4, 1995 [NL] Netherlands .................. 1000932

[51] Int. Cl.⁶ ............................................ F16H 61/00
[52] U.S. Cl. ............................................. 474/18; 474/28
[58] Field of Search .............................. 474/8, 18, 28

[56] References Cited

U.S. PATENT DOCUMENTS

| | | | |
|---|---|---|---|
| 3,948,111 | 4/1976 | Dittrich | 474/28 X |
| 4,504,246 | 3/1985 | Mott | 474/8 |
| 4,552,545 | 11/1985 | Koivunen | 474/28 X |
| 4,639,238 | 1/1987 | Jaccod | 474/28 X |
| 4,946,423 | 8/1990 | Van Beek | 474/28 X |
| 5,458,540 | 10/1995 | Moan et al. | 474/28 |

FOREIGN PATENT DOCUMENTS

| | | |
|---|---|---|
| 0 615 080 | 9/1994 | European Pat. Off. |
| 28 53 028 | 6/1980 | Germany . |
| 929326 | 6/1963 | United Kingdom . |
| WO 86/02704 | 5/1986 | WIPO . |

Primary Examiner—Roger J. Schoeppel
Attorney, Agent, or Firm—Young & Thompson

[57] ABSTRACT

A pulley, in particular for a continuously variable transmission, provided with two sheaves placed on a pulley shaft, at least one sheave being movable in the axial direction relative to the pulley shaft by movement structure. This movement structure includes at least one piston/cylinder assembly, and also fixing structure which fixes the movable sheave in the direction of rotation relative to the pulley shaft. According to the invention, the fixing structure is fitted at least inside a cylinder of the piston/cylinder assembly.

17 Claims, 3 Drawing Sheets

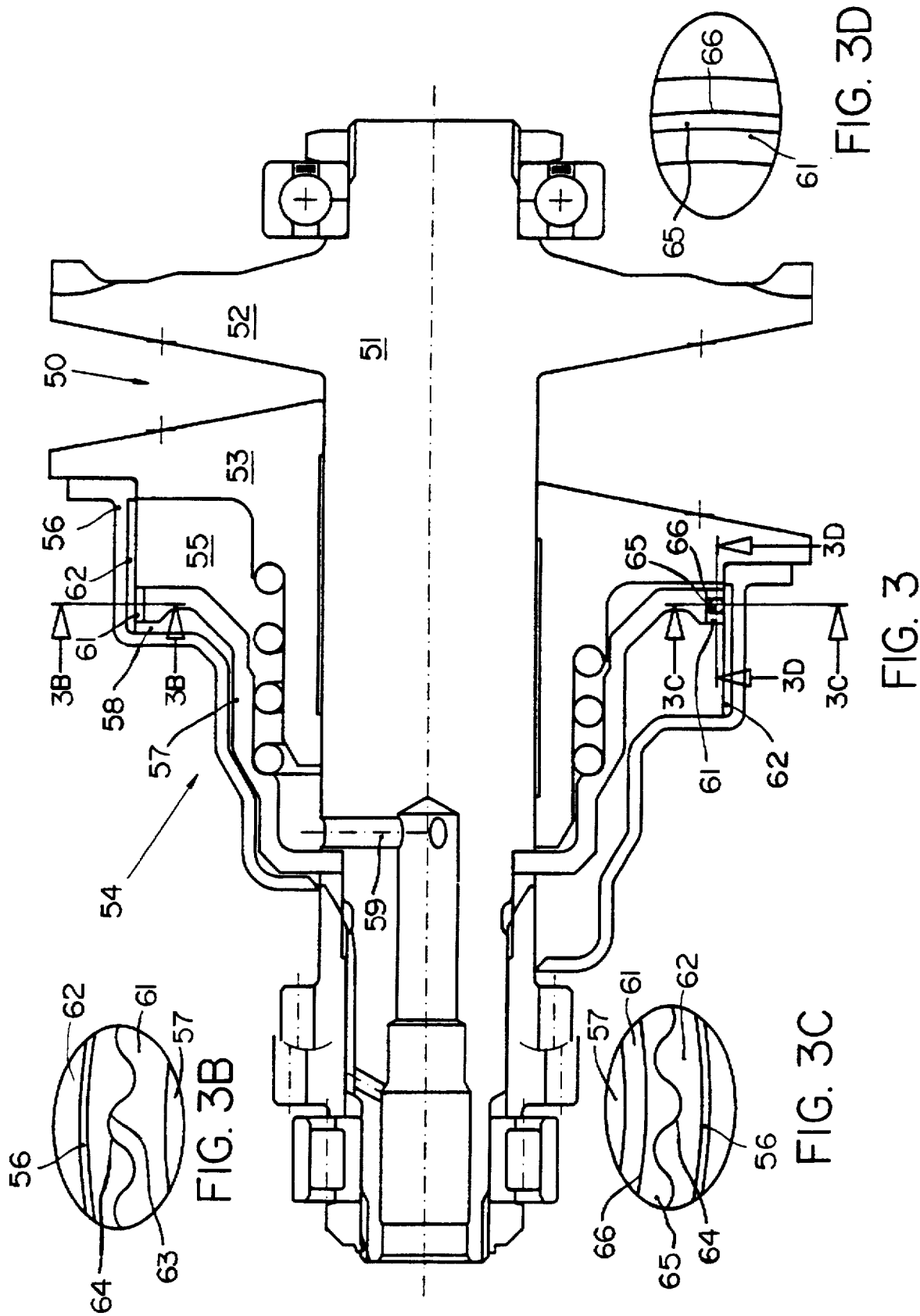

PULLEY

The invention relates to a pulley, in particular for a continuously variable transmission, provided with two sheaves placed on a pulley shaft, at least one of the sheaves being movable in the axial direction relative to the pulley shaft by means of movement means, which movement means comprise at least one piston/cylinder assembly, and also provided with fixing means which fix the movable sheave in the direction of rotation relative to the pulley shaft.

Such a pulley is known from European Patent Application No. 0615080, and is used in particular in continuously variable transmissions, for example for motor vehicles. In such a transmission a drive belt is fitted over two pulleys, and an infinite number of transmission ratios can be set within a certain range by varying the radial positions of the drive belt between the pulleys. The variation of the radial position of the drive belt between a pulley is achieved by the axial movement of the movable sheave relative to the pulley shaft by means of the movement means. The movable sheave must also be fixed in the direction of rotation relative to the pulley shaft, in order to be able to transmit torque.

In the case of this known pulley the movable sheave is fixed in the direction of rotation, but in the axial direction is freely movable by means of tooth/groove connections. These tooth/groove connections are fitted both radially and axially outside the movement means. Fitting the tooth/groove connection outside the movement means requires additional fitting space both in the axial and in the radial directions. Furthermore, the necessary additional operations and parts make the construction expensive and complicated.

The object of the invention is to overcome the above-mentioned disadvantages and to provide a simple and cheap pulley which also requires little fitting space. The pulley according to the invention is characterized in that the fixing means are fitted at least inside a cylinder of the piston/cylinder assembly. Fitting the fixing means inside the cylinder of the piston/cylinder assembly means that a pulley with little fitting space is obtained. Furthermore, a smaller number of operations and parts will suffice, so that a simple, light and cheap construction is obtained.

According to a further characteristic, the fixing means are fitted over the entire circumference of the cylinder. In this way, an advantageous distribution of the forces occurring is obtained during the torque transmission, with the result that the fixing means can be simple and light in design. Moreover, a limited number of parts will suffice, which greatly simplifies the fitting and construction of the fixing means.

The fixing means in this case can be fitted between the piston and the cylinder of the piston/cylinder assembly. Furthermore, the fixing means can be fitted between the two cylinders of a piston/cylinder assembly with two cylinders. These locations inside the movement means permit simple fitting of the fixing means, and such fitting also requires little fitting space.

The fixing means can comprise an inner ring and/or an outer ring, which means that only a limited number of parts are needed, which simplifies the manufacture of the fixing means and also the construction and fitting thereof. According to the invention, the fixing means can comprise a radially outward directed profile, and a radially inward directed profile, which profiles engage in each other. This is a simple way of producing a coupling between the movable sheave and the pulley shaft. The two profiles in this case can be fitted on the fixing means in such a way that they connect to each other with narrow tolerances at least in the direction of rotation. This means that play-free fixing of the movable sheave relative to the pulley shaft is obtained in the direction of rotation. The pulley can also be characterized in that the profiles of the fixing means are of a tooth-shaped or polygon-shaped design. Such profiles provide not only play-free fixing of the movable sheave relative to the pulley shaft, but also an advantageous distribution of the forces occurring during the torque transmission.

According to the invention, the fixing means can be fitted at the position where the piston and the cylinder seal off the pressure chamber. In this case the fixing means can comprise a seal. The combination with a seal means that it is simple to fit the fixing means at places in the pulley where the pressure chamber must be sealed off from the environment. The fixing means consequently fix the movable sheave relative to the pulley shaft, while the fixing means also seal off the pressure chamber. As a result of this combination, the pulley can be of simple design, and this construction requires no additional fitting space. The seal can follow the contour of one of the profiles in the direction of rotation, in particular the radially outward directed profile. A good seal is consequently obtained over the entire circumference of the cylinder, while the axial movement of the movable sheave is not adversely affected either. Furthermore, the seal according to the invention can be an O-ring.

The fixing means according to the invention can also be designed in such a way that the contact surfaces of the fixing means have a low coefficient of friction at least in the axial direction. This facilitates the axial movement of the movable sheave relative to the pulley shaft.

The fixing means can be made of, for example, a synthetic material such as a polyamide, or a metal such as aluminium. These materials are simple to work, so that the fixing means can be manufactured by simple techniques. Moreover, a light, simple, strong and cheap construction is obtained in this way.

The invention also relates to a continuously variable transmission, provided with a pulley according to the invention.

The invention will be explained with reference to a drawing, in which in succession:

FIG. 3 shows in section a second and third embodiment of a pulley according to the invention.

Figure 1:
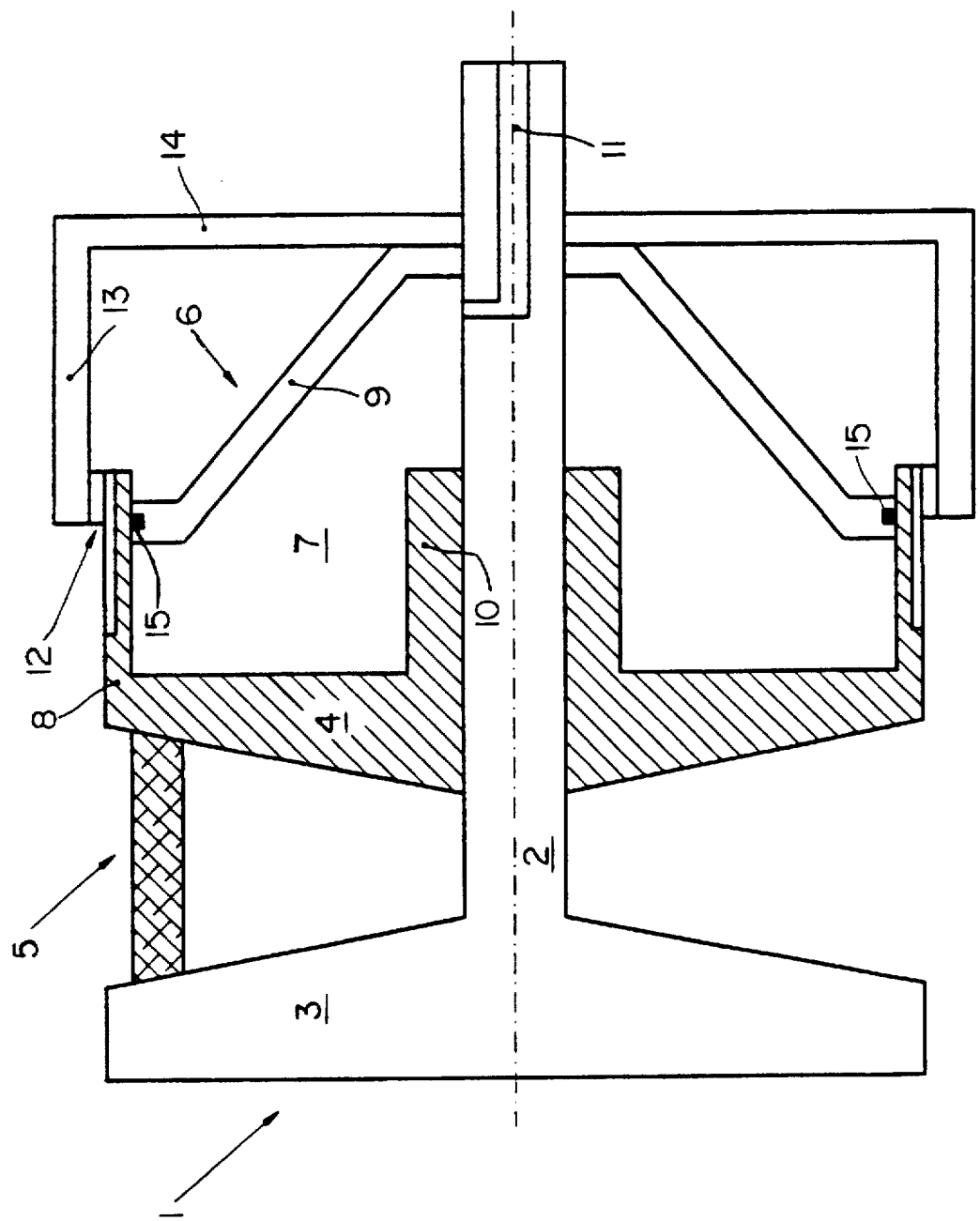
FIG. 1 shows in section and diagrammatically a pulley according to the prior art.

FIG. 1 shows diagrammatically in section a pulley according to the prior art. The pulley (1), which is used in particular in a continuously variable transmission, is placed on a pulley shaft (2) and comprises a fixed sheave (3) and a movable sheave (4). The movable sheave (4) is movable in the axial direction relative to the pulley shaft (2) by means of movement means (6), which are in the form of a hydraulic piston/cylinder assembly. The piston/cylinder assembly has a pressure chamber (7) which is enclosed by the movable sheave (4), the cylinder (8), the piston (9), the pulley shaft (2) and the collar (10) of the movable sheave. The piston (9) in this case is immovably fixed on the pulley shaft (2) and rests with its other end against the cylinder (8). A fluid brought to pressure, for example an oil, can be conveyed to and from the pressure chamber (7) by way of the passage (11). In this way, the movable sheave (4) can be moved in the axial direction relative to the pulley shaft (2).

A drive belt (5) is fitted between the sheaves (3, 4). The radial position of the drive belt (5) between the sheaves (3, 4) partly determines the transmission ratio of the continuously variable transmission. It is possible to vary the radial position of the drive belt (5) between the sheaves (3, 4) by moving the movable sheave (4) by means of the movement means (6) in the axial direction relative to the pulley shaft (2). In this way, the transmission ratio of the continuously variable transmission can be set in an infinitely variable manner at an infinite number of values within a certain range.

In order to permit torque transmission between the pulley shaft (2) and the sheaves (3, 4), the movable sheave (4) must be fitted non-rotatably on the pulley shaft (2). Moreover, the movable sheave (4) must be movable in the axial direction relative to the pulley (2), in order to be able to set a transmission ratio. The sheave (4) is fitted on the pulley shaft in a non-rotatable, but axially movable manner by means of the tooth/groove connection (12). The tooth/groove connection (12) is fitted radially and axially outside the movement means (6). In this case the tooth/groove connection (12) is fitted both on the outside of the cylinder (8) and on the wall (13). The wall (13) is immovably fixed on the pulley shaft (2) by way of wall (14). In this way, the movable sheave (4) is fixed in the direction of rotation relative to the pulley shaft (2). However, such a connection requires additional fitting space both in the radial and in the axial direction. Furthermore, the additional operations and the parts (13), (14) make the construction expensive and complicated.

In order to ensure that the axial movement of the movable sheave (4) relative to the pulley shaft (2) is not adversely affected, it is desirable for the pressure chamber (7) to be adequately sealed off from the environment. In order to ensure that the fluid which has been brought to pressure is prevented as far as possible from leaking from the pressure chamber (7) to the environment, a seal (15) is fitted between the piston (9) and the cylinder (8).

Figures 2, 2A:
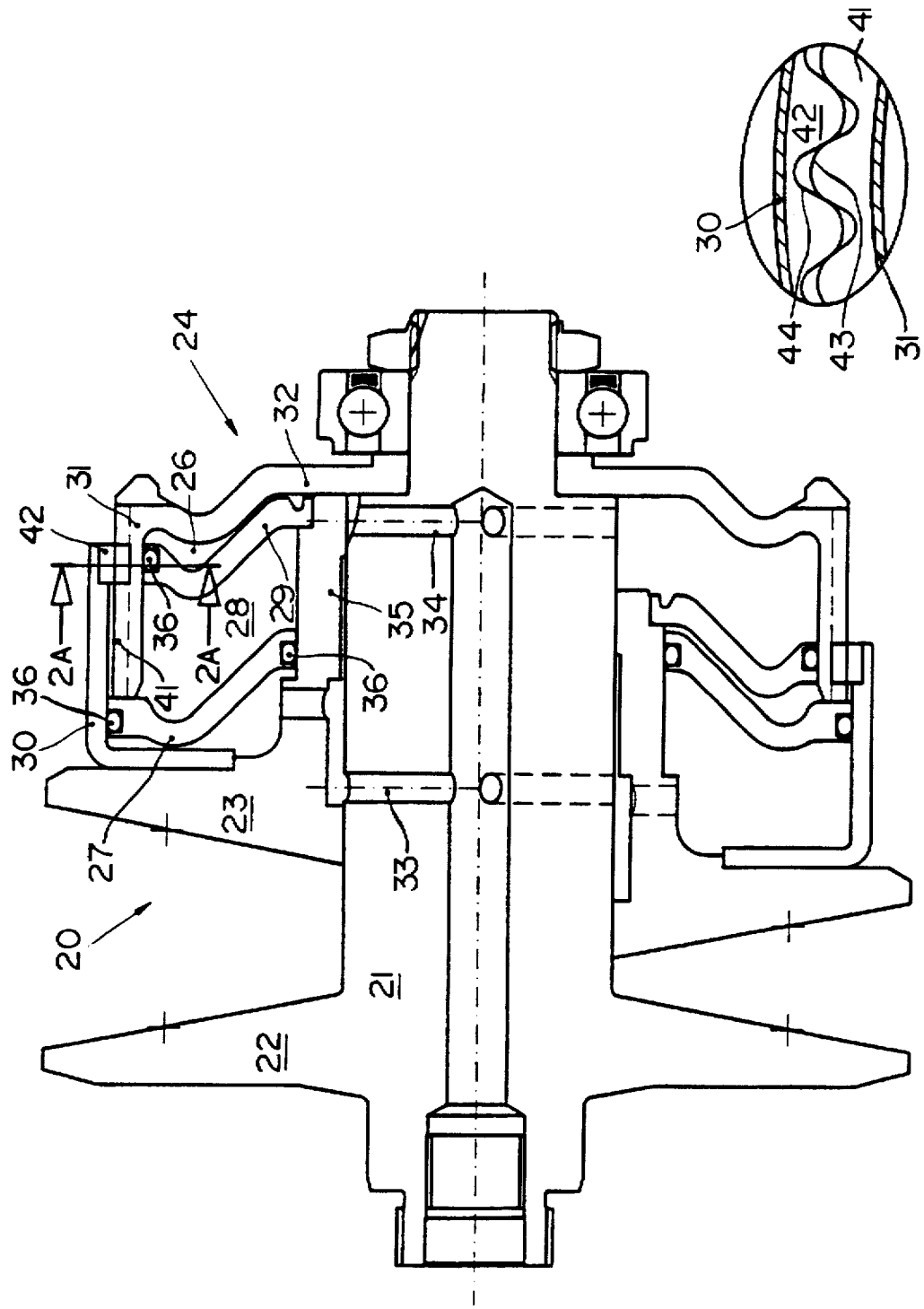
FIG. 2 shows in section an embodiment of a pulley according to the invention.

FIG. 2 shows in section a pulley according to the invention. The pulley (20) is placed on a pulley shaft (21) and comprises a fixed sheave (22) and a movable sheave (23), which movable sheave is movable in the axial direction relative to the pulley shaft (21) by means of movement means (24). The movement means (24) are in the form of hydraulic piston/cylinder assemblies and have two pressure chambers (25) and (26), and also a pressureless intermediate chamber (28). A fluid which has been brought to pressure can be conveyed by way of the passages (33) and (34) from and to the pressure chambers (25) and (26) respectively. In this way, the movable sheave (23) can be moved in the axial direction relative to the pulley shaft (21). The pressure chamber (25) is enclosed by the movable sheave (23), the cylinder (30), the piston (27) and the collar (35) of the movable sheave (23). The pressure chamber (26) is enclosed by the piston (29), the cylinder (31), the wall (32) and the pulley shaft (21). The piston (27) is disposed in such a way that it is slidable between the cylinder (30) and the collar (35). Furthermore, the piston (27) is immovably fixed to the cylinder (31). The piston (29) is immovably fixed on the collar (35) and rests with its other end against the cylinder (31). Fitted at different places inside the movement means (24) are a number of sealing rings (36), which seal off the pressure chambers (25) and (26) from the pressureless chamber (28) and the environment. The pressureless chamber (28) is not completely sealed off, but is in open communication with the (external) environment by way of a number of slits (not shown in the figure) in the cylinder (31) and the space between the cylinders (30) and (31).

According to the invention, the pulley is provided with fixing means (41) and (42), which fixing means are fitted inside the cylinder (30) of the piston/cylinder assembly of the movement means and fix the movable sheave (23) in the direction of rotation relative to the pulley shaft (21). Owing to the fact that the fixing means are fitted inside the cylinder (30), a simple and cheap pulley with little axial and radial fitting space is obtained.

The section A—A shows an enlarged detail of the fixing means which are fitted between the cylinders (30) and (31) of the movement means (24). The fixing means can preferably be fitted over the entire circumference of the cylinders (30) and (31), with the result that the fixing means consist of a small number of parts, while a simple construction and simple fitting, and also in the torque transmission an advantageous distribution of the forces occurring, are obtained. The fixing means are in the form of an inner ring (41), which is fitted on the outside of the cylinder (31), and an outer ring (42), which is fitted on the inside of the cylinder (30). The inner ring (41) is provided with a radially outward directed profile (43), and the outer ring (42) is provided with a radially inward directed profile (44). The two profiles (43) and (44) engage in each other and fix the movable sheave (23) in the direction of rotation relative to the pulley shaft (21). The inner ring (41) and the outer ring (42) are slidable past each other in the axial direction, as a result of which the axial movement of the movable sheave (23) relative to the pulley shaft (21) is not impeded. In order to keep the freedom of rotation of the movable sheave (23) relative to the pulley shaft (21) as low as possible, the profiles (43) and (44) are fitted on the inner ring (41) and the outer ring (42) respectively in such a way that the profiles connect to each other with narrow tolerances at least in the direction of rotation.

In the direction of rotation, the play between the two profiles (43) and (44) should be as low as possible, but in this case the inner ring (41) and the outer ring (42) must not seal off the pressureless chamber (28) from the environment. To this end, the profiles (43) and (44) are flattened off slightly in the radial direction, with the result that some play is present in the radial direction between the inner ring (41) and the outer ring (42). This means that the pressureless chamber (28) can be aerated and vented, so that the axial movement of the movable sheave (23) relative to the pulley shaft (21) and also the setting of the transmission ratio of the continuously variable transmission are promoted.

During the axial movement of the movable sheave (23) relative to the pulley shaft (21), the inner ring (41) and the outer ring (42) slide past each other. In order to promote the axial movement of the movable sheave (23), the contact surfaces of the inner ring (41) and the outer ring (42) have a low coefficient of friction in the axial direction. A low coefficient of friction can be obtained, for example, by making the inner ring (41) and the outer ring (42) of synthetic material. A suitable synthetic material can be polyamide (nylon-6) or polytetrafluoroethylene (teflon). The inner ring (41) and the outer ring (42) can also be made of a metal, for example aluminium. The inner ring (41) and outer ring (42) can consequently be made by simple and cheap techniques. Furthermore, the inner ring (41) and the outer ring (42) are light and durable and are simple to fit.

The inner ring (41) and the outer ring (42) in this embodiment are provided with profiles (43) and (44) which are a polygonal shape. However, the profiles (43) and (44) can also be other shapes, for example a toothed shape.

FIG. 3 shows above the axis of the pulley a second embodiment of a pulley according to the invention and below the axis of the pulley a third embodiment of a pulley according to the invention. The pulley (50) is placed on a pulley shaft (51) and comprises a fixed sheave (52) and a movable sheave (53), which is movable in the axial direction relative to the pulley shaft (51) by means of movement means (54) in the form of a piston/cylinder assembly.

According to the invention, the pulley (50) is provided with an inner ring (61) and an outer ring (62), which are fitted inside the cylinder (56) of the piston/cylinder assembly (54). In this embodiment, the inner ring (61) and the outer ring (62) are fitted at the position where the piston (57) and the cylinder (56) seal off the pressure chamber (55) relative to the pressureless chamber (58). The inner ring (61) is fitted on the piston (57) and provided with a radially outward directed profile (63), while the outer ring (62) is fitted on the inside of cylinder (56) and is provided with a radially inward directed profile (64). The two profiles connect to each other with narrow tolerances in the direction of rotation, so that the movable sheave (53) is fixed non-rotatably relative to the pulley shaft (51). Through the fitting of the inner ring (61) and the outer ring (62) at the position where the pressure chamber (55) is sealed off, they should have adequate sealing capacity to ensure that the setting of the transmission ratio of the continuously variable transmission is not adversely affected. As the section B—B shows in an enlarged detail, the profiles (63) and (64) are designed in such a way that the inner ring (61) and the outer ring (62) connect to each other with narrow tolerances over the entire circumference. In this way a completely play-free seal of the pressure chamber (55) and a non-rotatable fixing of the movable sheave (53) relative to the pulley shaft (51) are obtained.

An improved seal is obtained for the pressure chamber (55) by providing the fixing means with an additional seal, in the form of a sealing ring (65), as the underside of the pulley in FIG. 3 and the sections C—C and D—D show in enlarged detail. The sealing ring (65) in this case is fitted over the entire circumference of the cylinder (56) in a groove (66) made in the inner ring (61) of the fixing means. The contour of the sealing ring (65) is formed in such a way that said contour follows the profile (63) of the inner ring (61). The pressure chamber (55) is consequently sealed off, while the sealing ring (65) is not adversely loaded during the axial movement of the movable sheave (53). The sealing ring (65) may be in the form of a standard O-ring, if desired.

As in the embodiment of the fixing means shown in FIG. 2, the inner ring (61) and the outer ring (62) can be made of, for example, a synthetic material or of a light metal. A simple, light, cheap and durable construction is consequently obtained by simple manufacturing techniques, which construction not only fixes the movable sheave (53) in the direction of rotation relative to the pulley shaft (51), but also adequately seals the pressure chamber (55) off from the movement means (54).

It will be clear that the fixing means can be fitted fully or partially in the piston/cylinder assembly, in particular the piston and the cylinder thereof, instead of using inner and outer rings.

I claim:

1. In a pulley, in particular for a continuously variable transmission, provided with two sheaves placed on a pulley shaft, at least one of the sheaves being movable in the axial direction relative to the pulley shaft by means of movement means, which movement means comprise at least one piston/cylinder assembly, and said movement means being also provided with fixing means which fix the movable sheave in the direction of rotation relative to the pulley shaft; the improvement wherein the fixing means comprise at least one separate non-integral element separately fixed to the piston/cylinder assembly and which element is provided with at least one spline or groove.

2. Pulley according to claim 1, wherein the fixing means are fitted over the entire circumference of the cylinder.

3. Pulley according to claim 1, wherein the fixing means are fitted between the piston and the cylinder of the piston/cylinder assembly.

4. Pulley according to claim 1, wherein the fixing means comprise an inner ring or outer ring.

5. Pulley according to claim 1, wherein the fixing means comprise a radially outwardly directed profile, and a radially inwardly directed profile, which profiles engage in each other.

6. Pulley according to claim 5, wherein the two profiles connect to each other with narrow tolerances at least in the direction of rotation.

7. Pulley according to claim 6, wherein the profiles of the fixing means are tooth-shaped.

8. Pulley according to claim 5, wherein the profiles of the fixing means are polygon-shaped.

9. Pulley according to claim 1, wherein the piston/cylinder assembly comprises two cylinders, and the fixing means are fitted between the cylinders of the piston/cylinder assembly.

10. Pulley according to claim 1, wherein the fixing means are fitted at a position where the piston and the cylinder seal off the pressure chamber.

11. Pulley according to claim 1, wherein the fixing means comprise a seal.

12. Pulley according to claim 11, wherein the seal follows the contour of one of the profiles in the direction of rotation.

13. Pulley according to claim 11, wherein the seal is an O-ring.

14. Pulley according to claim 1, wherein contact surfaces of the fixing means have a low coefficient of friction in the axial direction.

15. Pulley according to claim 1, wherein the fixing means are made of a synthetic material.

16. Pulley according to claim 1, wherein the fixing means are made of aluminum.

17. Continuously variable transmission provided with a pulley according to claim 1.

* * * * *